United States Patent

Walsh et al.

[15] 3,665,413

[45] May 23, 1972

[54] WAVEFORM REGENERATOR FOR USE WITH A DIGITAL CORRELATOR

[72] Inventors: George M. Walsh, Middletown; Mark A. Chramiec, Newport, both of R.I.

[73] Assignee: Raytheon Company, Lexington, Mass.

[22] Filed: July 29, 1970

[21] Appl. No.: 64,100

Related U.S. Application Data

[63] Continuation of Ser. No. 695,257, Jan. 2, 1968.

[52] U.S. Cl. ....................340/172.5, 235/181

[51] Int. Cl. ....................G05b 1/01, G01s 3/86

[58] Field of Search ....................340/172.5; 235/181

[56] References Cited

UNITED STATES PATENTS

| | | | |
|---|---|---|---|
| 2,978,680 | 4/1961 | Schulte, Jr. | 340/172.5 |
| 3,153,776 | 10/1964 | Schwartz | 340/172.5 |
| 3,443,070 | 5/1969 | Derby et al. | 340/172.5 |
| 3,465,301 | 9/1969 | Osborn | 340/172.5 |

*Primary Examiner*—Paul J. Henon
*Assistant Examiner*—Paul R. Woods
*Attorney*—Harold A. Murphy and Joseph D. Pannone

[57] ABSTRACT

A waveform regenerator for use with a digital correlator having a first circulating memory and a second precessing circulating memory for storing and processing digital signal sequences. The apparatus comprises circuits responsive to each successive digital signal sample in the second memory for extracting the digital signal and reproducing each sample for a time interval equal to one circulating memory cycle. Reverse Order Logic is included in the second circulating memory for changing the order of succession of the digital signal samples. Means responsive to the contents of the first memory and the second memory replace the digital signal samples contained in the second memory by the digital signal samples stored in the first memory in the proper sequence to be extracted from the second precessing circulating memory.

12 Claims, 5 Drawing Figures

INVENTORS
GEORGE M. WALSH
MARK A. CHRAMIEC
BY Robert Bruce Brodie
ATTORNEY

INVENTORS
GEORGE M. WALSH
MARK A. CHRAMIEC
BY Robert Bruce Brodie
ATTORNEY

INVENTORS
GEORGE M. WALSH
MARK A. CHRAMIEC
BY Robert Bruce Brodie
ATTORNEY

WAVEFORM REGENERATOR FOR USE WITH A DIGITAL CORRELATOR

This application is a Continuation of Application Ser. No. 695,257, filed Jan. 2, 1968.

BACKGROUND OF THE INVENTION

This invention relates to waveform regenerating apparatus and, more particularly, to waveform regenerating apparatus used in combination with digital signal correlators. The use of correlators for extracting a signal out of noise is well known to the electrical signal processing art. The correlation technique consists of multiplying a received signal by successive received signals or by a prestored pattern. A digital signal correlator having a memory for storing one binary sequence and a circulating memory for storing another binary sequence is shown in FIG. 1 of U. S. Pat. No. 3,185,958 issued to H. T. Masterson et al. on May 25, 1965. Such systems also are described in "-Digital Impressed Time Correlators and Matched Filters for Active Sonars," Journal of Acoustical Society of America, Vol. 36, No. 1, Jan. 1964, pages 121 through 319. Digital signal correlators find application in acoustic signaling and ranging systems and elsewhere. Such acoustic systems, particularly those used in underwater environments, require the repetitive generation of exact signal waveforms to insure proper operation of associated signal correlation devices. These systems have required the use of stabilized oscillators and/or waveform generators for driving the acoustic transmitters. Such stabilized reference sources may be, and frequently are, complex devices. Reference to the complexity of prior art waveform signal generators in acoustic signaling may be found in "Journal of the Acoustical Society of America," Vol. 40, No. 5, November 1966, page 1,278 at 611.

It is accordingly an object of this invention to eliminate complex waveform signal generators and replace them with another form of repetitive signaling device without alteration or deterioration of the reference waveshape.

It is another object of this invention to simplify the signal generating portion of signaling or ranging systems which use signal correlators in their receiving portion.

It is a further object of this invention to devise a waveform regenerator which exhibits exact repeatability and stability for a variety of reference waveshapes.

SUMMARY OF THE INVENTION

The foregoing objects are satisfied in an embodiment of the invention used in combination with a digital correlator. The digital correlator has a first circulating memory and a second precessing circulating memory for storing digital sequences. The apparatus comprises circuits responsive to each successive digital signal sample in the second precessing circulating memory for extracting the digital signal and reproducing it for a time interval equal to one first circulating memory cycle. Reverse Order Logic is included within the second precessing circulating memory for changing the order of succession of the digital signal samples. Means are responsive to the contents of the first circulating memory and the second precessing circulating memory for replacing the digital signal samples contained in the second precessing circulating memory by the digital signal samples from the first memory.

This apparatus takes advantage of the memories otherwise available to a digital correlator in signal processing systems. Further, there is no limitation as to the type of waveform which can be introduced into the first circulating memory. Thus, successive identical waveforms, having arbitrary delays (produced by multiple recirculation), may be generated from a single reference waveshape.

If two circulating memories are used, with the second recirculating memory having a shorter recycle time than the first memory, then the digital signal samples contained in the second memory will precess with respect to the contents of the first memory, and a waveshape may be gated out from the second memory by an extraction signal which is synchronized with the recirculation time of the first memory. The extracted signal samples are then each successively produced continuously for an interval equal to the recirculation time of the first memory. This precessed regeneration continues until the product of a number of precessions and the time delay difference between the first and second memories equals the delay of the first memory. This particular embodiment may be readily implemented because many digital correlators of simple design use circulating memories. Further, the use of circulating memories results in simplification of transmitter equipment by replacing the separate complex wave reference waveform generator by a simple, non-repetitive waveform generator. Thus, the objects of repetitiveness without deterioration of the reference waveform as well as simplification of structure are satisfied.

If a subordinate loop with appropriate delay is inserted in the second processing circulating memory, it becomes possible to change the order of succession of the digital signals. This permits the reconstruction of the waveform output either time reversed or in time succession. Illustratively, a negative analog slope could be generated by a time reversed sequence of digital values which ordinarily increase with time.

DESCRIPTION OF THE PREFERRED EMBODIMENT

As previously mentioned, the apparatus embodying this invention is for use in combination with a digital correlator. Such digital correlators have a circulating memory in which a received digital signal sequence is stored. Another memory, of the circulating type, is used for storing another reference digital sequence. Correlation is tested by comparing the match or mismatch condition of successive pairs of corresponding digital signals in the respective sequences. Such digital correlators may be used in analog signal processing systems if the appropriate analog-to-digital converters are used.

Figure 1A:
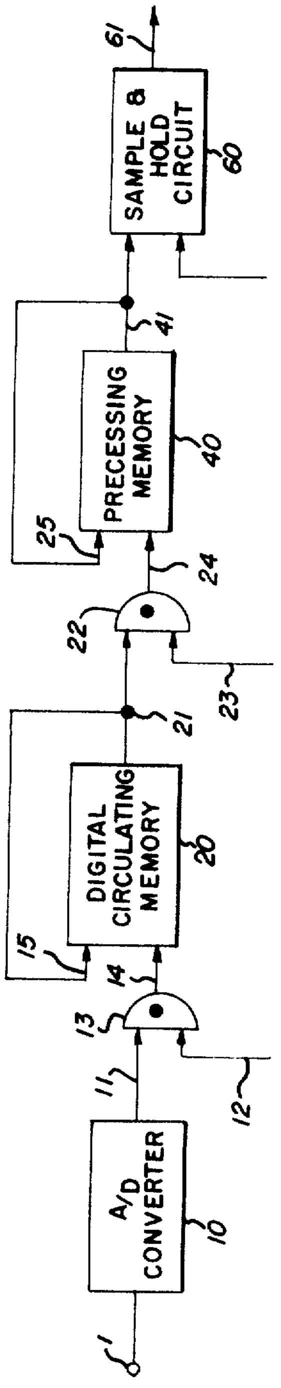
FIG. 1A shows a block diagram representation of the invention showing the use of the digital correlator memories.

FIG. 1A is a block diagram representation of this invention utilizing the memory systems of a digital correlator. When this apparatus is used with an acoustic system such as sonar, such systems generate a transmit waveform for each transmission by a waveform generator and store a sampled version of the waveform. Returning signals are cross correlated with this replica signal and a signal processing gain results. This is a function of the time-bandwidth product of the signal waveform and the degree of likeness between the two waveforms.

In FIG. 1A an analog waveform applied at input 1 is converted to a binary signal sequence by analog-to-digital converter 10. This is gated into a first circulating memory 20 at input 14 through AND gate 13. The system is further initialized by loading this digital sequence into a second circulating or precessing memory 40. Thus, the identical binary sequences are stored in both memories. A sample and hold circuit 60 is coupled to the output 41 of the precessing memory 40. This circuit operates to extract successive digital signal samples from the second memory 40 and reproduce each sample at output 61 for a time interval no greater than the circulation time of the second memory. For each signal extracted from the second memory 40 another digital signal replaces it from the first memory 20 as gated in through AND gate 22. Since the cycle time of the second memory is shorter than the cycle time of the first memory, there is a precession of the contents of the second memory with respect to corresponding contents of the first memory.

Figure 1B:
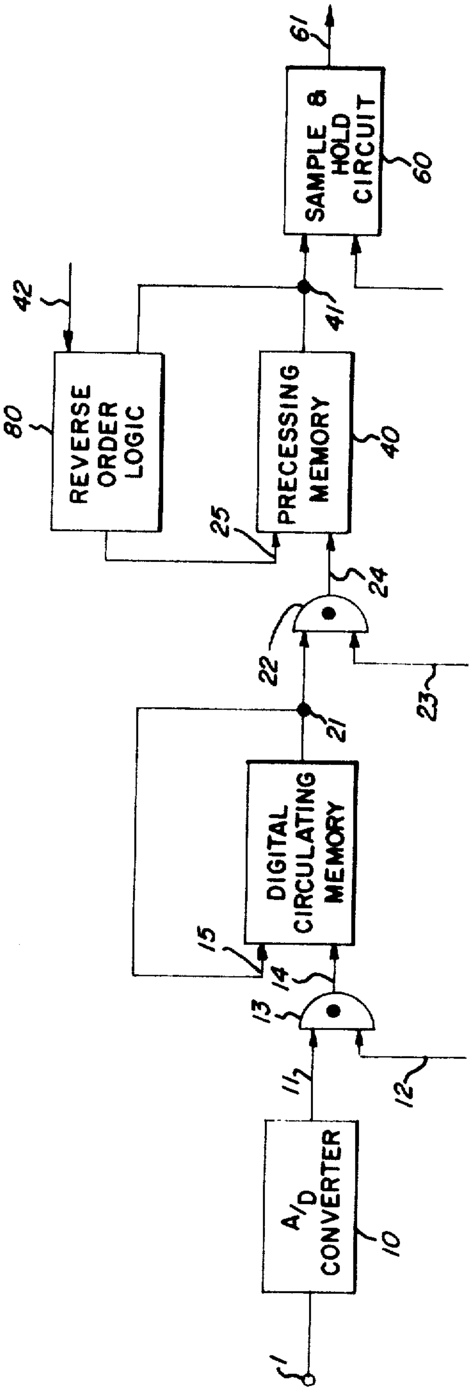
FIG. 1B is another block diagram representation of the invention showing the inclusion of Reverse Order Logic in the feedback path of one of the digital correlator memories.

FIG. 1B shows substantially the same block diagram relationships as is shown in FIG. 1A except for the addition of Reverse Order Logic 80 inserted in the feedback loop of the second memory. The Reverse Order Logic permits the change in the order of succession of digital signals so that a time reversal of the signal values with respect to time is achieved.

Figure 2A:
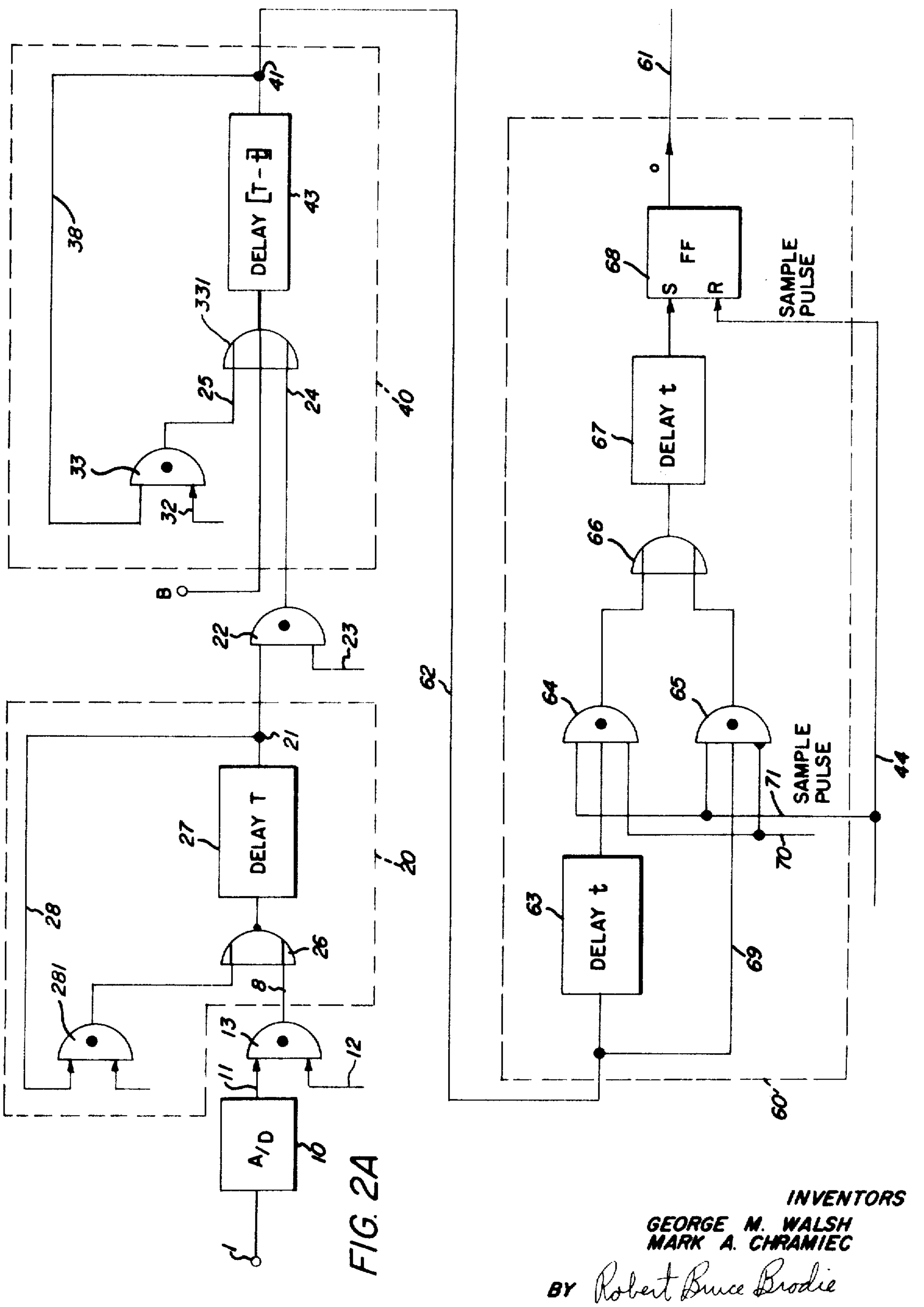
FIG. 2A is a detailed logical diagram of the structure set forth in FIG. 1A.

FIG. 2A shows the detailed logic of the block diagram shown in FIG. 1A. There are two operating modes to be described. The first mode is the initializing of the system through introducing the digital signal sequences into both memories. The second operating mode is the regeneration of the successive signal waveforms. A description is first given of each of the principal elements followed by an operating description with respect to the first and second modes.

Each circulating memory 20 and 40 comprises a delay element 27 or 43 and a gated reentrant loop formed respectively by line 28 and gates 281 and 26 for memory 20, and line 38 and gates 33 and 331 for memory 40 permit circulation of digital signal sequences for long periods of time with only minor signal degradation.

The sample and holding circuit 60 samples by accepting a digital signal from the sequence in the second precessing circulating memory for each round trip of the first memory.

In order to insert the appropriate signals contents into both memories an analog waveform is applied to analog-to-digital converter 10 for generating a corresponding digital signal sequence. The prior art in analog-to-digital conversion is well known.

The digital signal sequence is gated in by actuation of gate 13 on line 12 and is simultaneously introduced into the second memory 40 over lead B, at a rate of one digital signal sample for every sample pulse.

Figure 3:
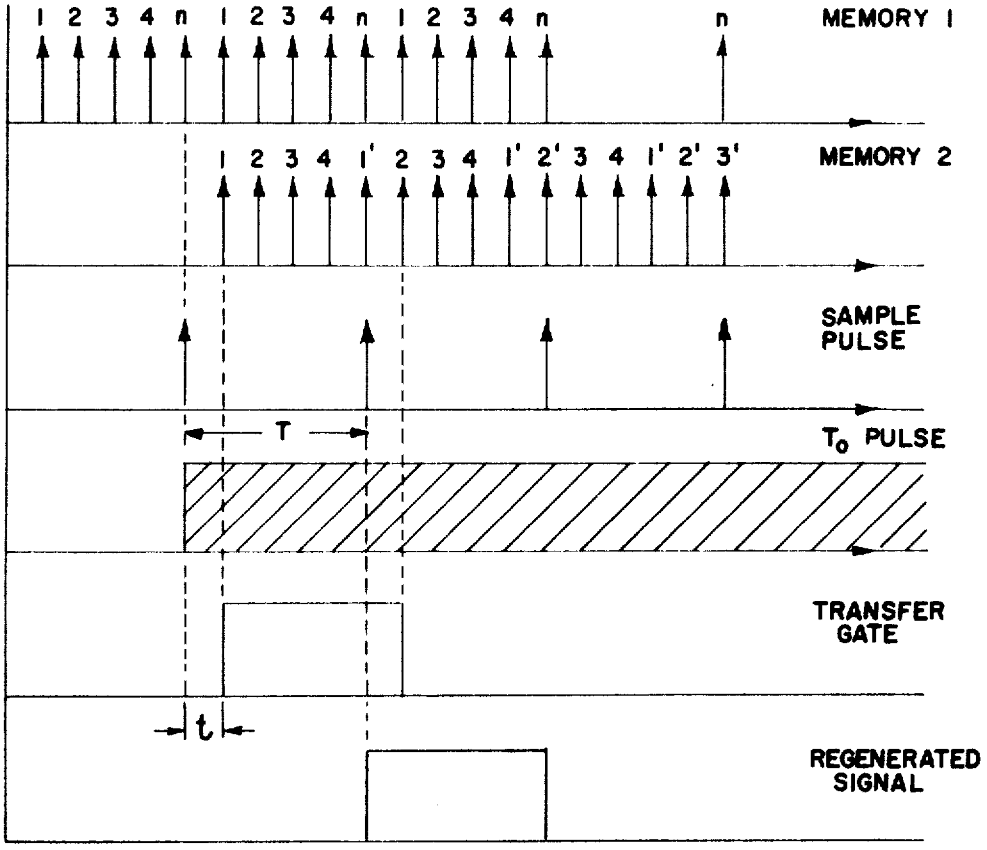
FIG. 3 is a timing and waveform diagram.

Reference should be made in the further description of this embodiment to the timing and waveform diagram shown in FIG. 3. It should be noticed that a $T_O$ pulse begins and ends on a sample pulse. The $T_O$ pulse is used to activate gate 13. The sample pulse is considered as the clock of the system. The time intervals are defined as T between successive sample pulses and $t$ between successive digital signal samples stored in the memories. The $T_O$ pulse is exactly equal to the desired output signal duration.

The output of the second memory 40 is sampled by AND gate 64 at just the correct time such that the first digital signal sample of the digital signal sequence in memory 40 may be gated through by the sample pulse applied on line 71. The recirculating delay of the second memory 40 is $T-t$ provided substantially by delay element 43. Consequently, the next sample pulse will occur when the second binary signal arrives at the input to AND gate 64. This process will continue until all of the digital signals in the sequence have been read out by successive sample pulses. This will be completed at the end of the $T_O$ pulse, which is the length of the waveform used to excite the transmitting acoustic transducer.

These digital signals which have been sampled are stretched by flip flop 68. They may be band pass filtered, if necessary, prior to excitation of the transmitting transducer. In this way, the replica of the transmitting signal is stored and the transmit pulse is derived from the same set of signals as is stored. This enhances the reproducibility of the transmitted pulse.

When the next transmission is to occur, the transfer gate enables AND gate 22. The transfer gate is exactly one sample period T in duration, and is delayed one clock pulse time $t$ from the sample pulse. The transfer gate is generated by external timing circuitry (not shown) and is derived from the sample pulse. This transfer gate transfers the contents of the first memory into the second memory in the correct signal sequence. That is the first binary signal is followed by the second binary signal etc. Of course, the contents of the first memory may be introduced to replace the contents of the second memory either one sample at a time or one whole digital sequence at a time. It should further be observed that the position of the digital signals in the second memory precesses with respect to the position of the signals in the first memory.

Delays 63, 67 are inserted in order to provide the correct time overlap for application of the sampled extracted signal and the sample pulse such that the stretched sample will turn the flip flop 68 off at the appropriate time.

Figure 2B:
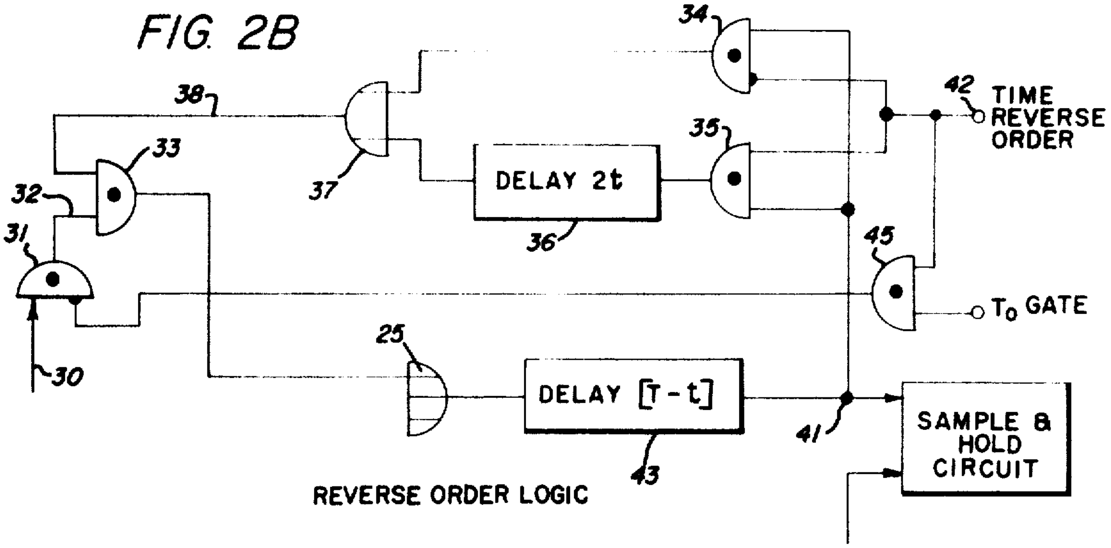
FIG. 2B shows the Reverse Order Logic of the elements shown with respect to the second memory in FIG. 1B.

FIG. 2B shows a Reverse Order Logic arrangement inserted in the feedback loop of memory 40. If an appropriate reverse order signal is applied at input 42, a first digital signal appearing at junction 41 is inhibited from its ordinary path via gates 34, 37, 33, and 25 and is diverted through AND gate 35 into delay element 36. The total recirculation time of the precessing second memory is now $T+t$. Thus, by appropriately adding the delay 36 successive digital signals in a sequence may be reversed in order of succession. This permits the time reversal of a signal.

The foregoing apparatus permits the repetitive generation of a digital signal sequence without requiring a complicated and precise signal generator. This is particularly advantageous in devices which transmit more than one pulse before reception of previous pulses such as in acoustic depth sounders. It is further useful where very accurate comparisons of successive transmissions are required, as when making studies of correlation losses or signal distortions.

These results are obtained when the signal regeneration apparatus is used in combination with a digital correlator having a first and second circulating memory in which the recycle time of the second circulating memory is less than or greater than that of the first circulating memory. If identical digital signal sequences are inserted in both memories, then a precessing pattern of waveform regeneration can be achieved by extracting a digital signal from the second memory and reproducing it for a period of time defined by the first memory cycle. If at the same time a digital signal sample from the first memory replaces the extracted digital signal sample, then regeneration will continue until the product of the number of precessions and the time delay difference between the memories equals the delay of the first memory. In this regard, it is not necessary that two circulating memories be used. The first memory can operate only as a buffer. In this type of configuration the precessing effect naturally is not used. Lastly, if a Reverse Order Logic is inserted in the second circulating memory, then it is easy to generate symmetrical waveshapes from unsymmetrical ones. Illustratively, successive increasing digital values in time may be made to appear as successive decreasing values in time.

We claim:

1. A signal generator comprising:
- a first recirculating memory for storing a sequence of signals therein, said recirculating memory having a predesignated recirculating delay time;
- a second recirculating memory for storing signals obtained from said first recirculating memory, said second recirculating memory having a predesignated recirculating delay time;
- means for selecting such ones of said signals stored within said first recirculating memory that are present at an output of said first recirculating memory at predetermined instants of time, said selecting means coupling said selected signals to said second recirculating memory;
- means for varying said predesignated recirculation delay time of said second recirculation memory; and
- means for withdrawing said selected ones of said stored signals from said second recirculating memory.

2. The generator as defined in claim 1, further comprising means for combining said withdrawn signals to form a single analog signal.

3. In a digital signal correlator of the class having a first memory and a circulating memory for storing digital signal sequences; wherein the improvement comprises:
- means for serially extracting digital signals from the first memory; and means for serially extracting digital signals from the circulating memory;
- means for comparing the match and mismatch conditions of the signals extracted from the circulating memory with a predetermined digital signal pattern;

said extracting means responsive to each successive signal in the circulating memory for extracting said digital signal and reproducing it for a time interval equal to one circulating memory cycle; and means for replacing each extracted circulating memory digital signal by a digital signal from the first memory.

4. In a digital signal correlator having a first memory and a circulating memory for storing digital signal sequences; wherein the improvement comprises:

means for serially extracting digital signals from the first memory; and means for serially extracting digital signals from the circulating memory;

means for comparing the match and mismatch conditions of the signals extracted from the circulating memory with a predetermined digital signal pattern;

said extracting means responsive to each successive digital signal in the circulating memory for extracting said digital signal and reproducing it for a time interval equal to one circulating memory cycle;

means for reversing the order of succession of digital signals in the circulating memory; and means for replacing each extracted circulating memory digital signal by a digital signal from the first memory.

5. In a digital correlator according to claim 4, wherein:

the means for reversing the order of succession of the digital signals comprises:

means for delaying a first digital signal by a time interval at least equal to two digital signal intervals; and means for inserting a second digital signal in a memory cycle time position prior in succession to the first digital signal.

6. In combination with a serial digital signal correlator having a first and second circulating memory for storing binary signal sequences; an apparatus for regenerating the digital signal sequences characterized in that:

the digital signal sequences in each memory are the same;

the apparatus comprises:

means responsive to each successive digital signal in the second circulating memory for extracting said digital signal and reproducing it for a time interval no greater than one circulating second memory cycle;

means in the second circulating memory for reversing the order of succession of preselected pairs of digital signals; and means for replacing each extracted second circulating memory digital signal by a successive digital signal from the first circulating memory.

7. A waveform regenerating apparatus for generating successive identical waveforms from a single reference waveform having arbitrary delays; the apparatus comprises:

a first and a second reentrant circulating memory for storing the reference waveform, the second memory having a shorter recycle time than the first memory; and a logic arrangement responsive to the contents of the respective memories for gating out a precessed waveshape with a time delay equal to the difference in circulation time between the memories, the regeneration continuing until the product of the number of precessions and the time delay difference equals the recirculation time of the first memory.

8. A waveform regenerating apparatus according to claim 7, characterized in that the second circulating memory comprises means for reversing the order of succession of the time varying values of the reference waveshape.

9. An apparatus according to claim 6, characterized in that the second circulating memory has a recycle time not equal to that of the first circulating memory; and further characterized in that the means in the second circulating memory for reversing the order of succession of samples of digital signals comprise:

means for delaying a first digital signal by a time interval at least equal to two digital signal intervals; and means for inserting a second digital signal in a memory cycle time position prior in succession to the first digital signal.

10. In a signal detection system in which signal samples stored in a first reentrant memory are applied as one input to a comparison circuit; the combination comprising:

a second reentrant memory containing a reference signal and having a recycle time shorter than the first memory; and means for applying a precessed waveshape as another input to the comparison circuit, said precessed waveshape having a time delay equal to the difference in circulation time between the reentrant memories, the precessed waveshape being applied until the product of the number of precessions and the time delay difference equals the recirculation time of the first reentrant memory.

11. In a data processing system, means for transferring serial trains of digital information between first and second devices, the first and second devices being operable at different bit rates, each train representing a word length composed of a predetermined number of bit intervals, said means comprising:

a first reentrant memory for storing successive digital trains;

means for transferring said digital trains from the first device to the first reentrant memory;

a second reentrant memory having a recycle time shorter than the first reentrant memory;

means responsive to each successive bit in the second reentrant memory for extracting said successive bit and reproducing it for a time interval equal to one second memory cycle; and means for replacing each extracted bit from the second reentrant memory by a bit signal from the first reentrant memory.

12. In a data processing system, means for transferring serial trains of digital information between first and second devices, the first and second devices being operable at different bit rates, each train representing a word length composed of a predetermined number of bit intervals, said means comprising:

a first reentrant memory for storing successive digital trains;

means for transferring said trains from the first device to the first reentrant memory;

a second reentrant memory having a recycle time shorter than the first memory for storing successive digital trains therein;

means responsive to each successive bit in the second circulating memory for extracting said bit and applying it to the second device for a time interval equal to a second reentrant memory cycle;

means for reversing the bit order of succession of the trains in the second reentrant memory; and means for replacing each extracted bit from the second reentrant memory by a bit from the first reentrant memory.

* * * * *